(12) United States Patent
Hirakoso et al.

(10) Patent No.: US 7,443,442 B2
(45) Date of Patent: Oct. 28, 2008

(54) IMAGE APPARATUS AND METHOD FOR COMPENSATING FOR HIGH AND LOW LUMINANCE IMAGE PORTIONS VIA EXPOSURE CONTROL AND GAMMA CORRECTION

(75) Inventors: Hiroto Hirakoso, Tokyo (JP); Haruhisa Itakura, Kanagawa (JP)

(73) Assignee: Sony Corporation (JP)

( * ) Notice: Subject to any disclaimer, the term of this patent is extended or adjusted under 35 U.S.C. 154(b) by 999 days.

(21) Appl. No.: 10/462,797

(22) Filed: Jun. 17, 2003

(65) Prior Publication Data

US 2004/0041928 A1 Mar. 4, 2004

(30) Foreign Application Priority Data

Jun. 19, 2002 (JP) ............................ P2002-178159

(51) Int. Cl.
*H04N 5/238* (2006.01)
*H04N 5/202* (2006.01)

(52) U.S. Cl. ........................................ 348/364; 348/254

(58) Field of Classification Search ................. 348/254, 348/255, 362, 363, 364, 365, 671, 672, 673; 382/169, 168
See application file for complete search history.

(56) References Cited

U.S. PATENT DOCUMENTS

| 4,969,045 | A | * | 11/1990 | Haruki et al. | ............ 348/229.1 |
|---|---|---|---|---|---|
| 5,194,960 | A | | 3/1993 | Ota et al. | |
| 5,974,190 | A | * | 10/1999 | Maeda et al. | ................ 382/255 |
| 6,040,860 | A | * | 3/2000 | Tamura et al. | ............... 348/252 |
| 6,141,047 | A | * | 10/2000 | Kawai et al. | ................. 348/254 |
| 6,922,209 | B1 | * | 7/2005 | Hwang et al. | ............ 348/229.1 |
| 7,142,712 | B2 | * | 11/2006 | Maruoka et al. | ............ 382/168 |

FOREIGN PATENT DOCUMENTS

JP 07-023287 1/1995

* cited by examiner

*Primary Examiner*—Justin P Misleh
(74) *Attorney, Agent, or Firm*—Rader Fishman Grauer PLLC; Ronald P. Kananen

(57) ABSTRACT

A detecting section for detecting a high-luminance object signal is provided. By using resulting detection data, an exposure control is performed so that the white levels of high-luminance objects do not become unduly high. Low-luminance objects are blackened under such imaging conditions. A gamma correction circuit is provided that can make the low-luminance objects appear good by compensating for the blackening. A control of changing the characteristic of the gamma connection circuit in real time in accordance with the object condition is performed, whereby the luminance level is raised in a low-luminance range. As a result, when wide-dynamic-range objects including the high-luminance objects and the low-luminance objects are shot, unduly high white levels of high-luminance objects and blackening of low-luminance objects are prevented and a good image is thereby produced.

11 Claims, 4 Drawing Sheets

IMAGE APPARATUS AND METHOD FOR COMPENSATING FOR HIGH AND LOW LUMINANCE IMAGE PORTIONS VIA EXPOSURE CONTROL AND GAMMA CORRECTION

BACKGROUND

1. Field of the Invention

The present invention relates to an image processing apparatus and a camera apparatus that execute signal processing for performing, on an image signal produced by imaging with one of various kinds of camera systems, an automatic exposure control that is adapted to imaging an object having a wide dynamic range, as well as to an automatic exposure control method for these apparatuses.

2. Description of the Related Art

A camera system is known in which a DSP (digital signal processor) performs signal processing, such as color separation, on a received image signal that is obtained by an imaging device and an automatic exposure control is performed on the imaging device by using an integration value of a luminance signal that is calculated by an OPD (optical detector) section of the DSP.

Incidentally, when shooting is performed with such a camera system in a backlight state, for example, a wide-dynamic-range image including both high-luminance objects and low-luminance objects, for example, is to be processed.

In this case, the following two methods are conceivable as an exposure control method of the conventional camera system:

(1) An exposure control is performed in such a manner as to be adjusted to the high-luminance objects; and (2) An exposure control is performed in such a manner as to be adjusted to the low-luminance objects.

However, method (1) has a problem that blackening occurs for the low-luminance objects because of an insufficient quantity of light. In method (2), the white levels of the high-luminance objects become unduly high.

FIGS. 5A-5C schematically illustrate specific examples of output images obtained by the above exposure control methods.

FIG. 5A shows an ideal exemplary image that was taken so as to have a wide dynamic range. Indoor objects (a wall 10, etc.) as low-luminance objects and an outdoor scene (a tree 20, etc.) as high-luminance objects are both imaged properly.

In contrast, in the case of FIG. 5B, since the exposure control method (1) (adjusted to the high-luminance objects) was employed, the indoor objects (wall 10, etc.) as the low-luminance objects are blacked because of insufficient light quantities. In the case of FIG. 5C, since the exposure control method (2) (adjusted to the low-luminance objects) was employed, the white levels of the outdoor scene (tree 20, etc.) as the high-luminance objects are unduly high.

SUMMARY OF THE INVENTION

An object of the present invention therefore is to provide an image processing apparatus and a camera apparatus that can properly process a wide-dynamic-range image including both high-luminance objects and low-luminance objects, for example, and thereby produce a good image, as well as an automatic exposure control method for these apparatuses.

An image processing apparatus according to the invention comprises detecting means for detecting a signal in a prescribed luminance range that is contained in an input, first image signal, exposure control means for controlling, in accordance with a detection result of the detecting means, an exposure amount to be used for an imaging operation on an object, and gamma correction means for correcting an output level of one or both of the first image signal and a second image signal, the gamma correction means having a function of adjusting a correction amount for a signal in a luminance range that is different from the prescribed luminance range.

A camera apparatus according to the invention comprises an imaging device, detecting means for detecting a signal in a prescribed luminance range that is contained in a first image signal received from the imaging device, exposure control means for controlling, in accordance with a detection result of the detecting means, an exposure amount to be used for an imaging operation on an object, and gamma correction means for correcting an output level of one or both of the first image signal and a second image signal, the gamma correction means having a function of adjusting a correction amount for a signal in a luminance range that is different from the prescribed luminance range.

An automatic exposure control method of a camera apparatus according to the invention comprises an image input step of receiving an image signal, a detecting step of detecting at least a high-luminance object signal contained in the image signal received by the image input step, an automatic exposure control step of controlling an exposure amount to be used for an imaging operation on an object in accordance with the high-luminance object signal detected by the detecting step, and a gamma correction step of controlling a gamma correction amount for the received image signal on the basis of the exposure amount controlled by the automatic exposure control step so that a luminance level in a low-luminance range of the image signal is raised.

The invention as described above makes it possible to produce a good image on the basis of an input image having a wide dynamic range.

DESCRIPTION OF THE PREFERRED EMBODIMENT

An image processing apparatus, a camera apparatus, and an automatic exposure method according to an embodiment of the present invention will be hereinafter described.

In this embodiment, when wide-dynamic-range objects including both high luminance objects and low-luminance objects are to be shot, as in the case of shooting in a backlight state, for example, first, a high-luminance object is detected and an exposure control is performed in such a manner as to be adjusted to its luminance. Then, a gamma (γ) correction is performed on an image signal produced by imaging under that exposure control to raise the output levels of low-luminance signal portions. As a result, a good output image is obtained.

Figure 1:
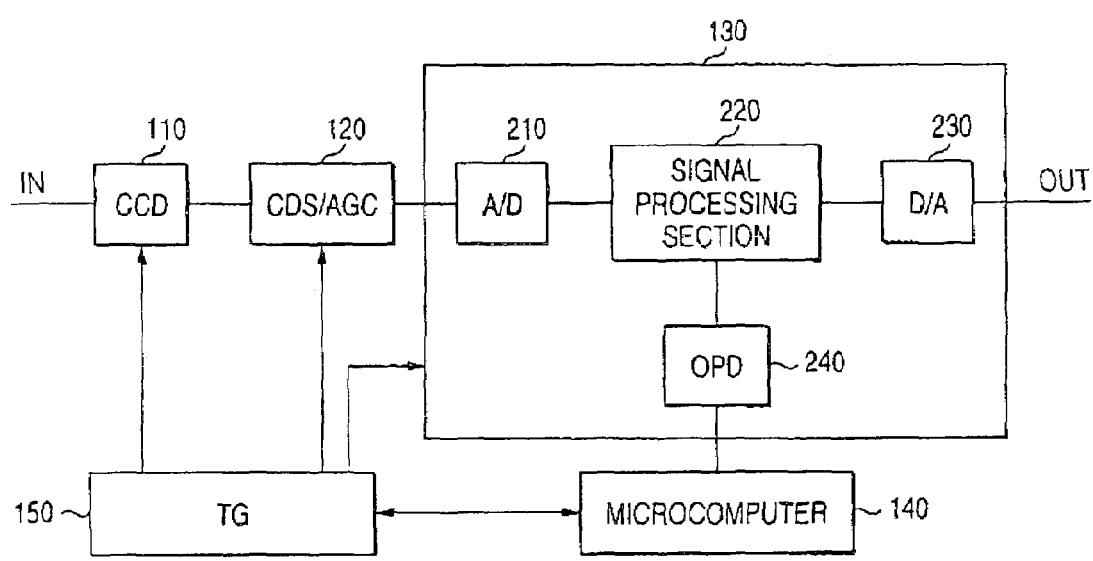
FIG. 1 is a block diagram showing the configuration of a camera apparatus according to an embodiment of the present invention.

FIG. 1 is a block diagram showing the configuration of a camera apparatus according to the embodiment of the invention.

As shown in FIG. 1, the camera apparatus according to the embodiment is equipped with a CCD imaging device 110, a CDS/AGC circuit 120, a digital signal processing circuit (digital signal processor; camera DSP) 130, a microcomputer 140, and a timing generator 150.

The CCD imaging device 110 converts an optical signal, imaged by a lens (not shown), of light coming from the front side from a camera into an electrical signal and outputs it as an image signal. The exposure light quantity of the CCD imaging device 110 can be controlled by controlling the drive timing. The imaging means is not limited to the CCD imaging device 110 and may be a CMOS sensor type imaging device or any of other kind of imaging means.

The CDS/AGC circuit 120 performs CDS (correlated double sampling) pixel noise elimination and AGC (automatic gain control) on the image signal that is output from the CCD imaging device 110, and outputs a resulting signal to the digital signal processing circuit 130.

The digital signal processing circuit (camera DSP) 130 converts the image signal received from the CDS/AGC circuit 120 into a digital signal, performs various kinds of digital signal processing on it after separating it into color signals and a luminance signal, returning the digital signal into an analog signal, and supplies the analog signal to a downstream output section. The digital signal processing circuit 130 has a A/D conversion section 210, a signal processing section 220, an D/A conversion section 230, an OPD (optical detector) section 240, etc.

The A/D conversion section 210 converts an analog image signal that is output from the CDS/AGC circuit 120 into a digital image signal.

The signal processing section 220 performs prescribed signal processing on the digital image signal received from the A/D conversion section 210. The signal processing section 220 has a color separation circuit, a white balance circuit, a gamma correction circuit, a color difference matrix circuit, an encoder circuit, etc. (all not shown).

The D/A conversion circuit 230 converts the digital image signal received from the signal processing section 220 into an analog image signal and outputs the analog image signal. The OPD section 240 receives color signals and a luminance signal from the signal processing section 220, integrates those signals, and outputs integration values (OPD data) of the respective signals to the microcomputer 140.

The microcomputer 140 performs various kinds of control operations in the camera apparatus of this embodiment; in particular, in the embodiment, the microcomputer 140 performs computation for an automatic exposure control.

The timing generator (TG) 150 supplies the individual sections of the camera apparatus of the embodiment with various timing signals for operation of those sections.

In particular, in the embodiment, when wide-dynamic-range objects including both high-luminance objects and low-luminance objects are to be shot, the following automatic exposure control is performed. First, a high-luminance object is detected on the basis of OPD data and an exposure control is performed by determining an exposure time that is suitable for the luminance of the high-luminance object. Then, on an image signal produced by imaging under the above exposure control, the gamma correction circuit of the digital signal processing circuit 130 performs a gamma correction that is suitable for the low-luminance objects, whereby the output levels of low-luminance signal portions are raised. As a result, an image that is satisfactory for both of the high luminance objects and the low-luminance objects can be obtained.

Next, an exposure control method that is an important feature of the camera apparatus according to the embodiment will be described.

The camera apparatus according to the embodiment produces an optimum output image by the following configuration and processing:

(A) A detecting means for detecting a high-luminance object signal is provided. This can be realized by reading integration value data that are supplied from the OPD section 240;

(B) An AE control algorithm according to which an exposure control is performed by using detection data of the detecting means of item (A), so that the white levels of high-luminance objects do not become unduly high, is provided. This can be realized in the form of software of the microcomputer 140;

(C) Low-luminance objects are blacked under the imaging conditions of item (B). A gamma correction means is provided that can make low-luminance objects appear good by compensating for the blackening. This can be realized by the gamma correction circuit of the signal processing section 220;

(D) An algorithm for the control of changing the characteristic of the gamma connection means of item (C) in real time in accordance with the object condition is provided. This can be realized in the form of software of the microcomputer 140; and (E) By combining the means and the control algorithms of items (A)-(D), a camera system is realized that prevents unduly high white levels of high-luminance objects and blackening of low-luminance objects and thereby produces a good image when wide-dynamic-range objects including high-luminance objects and low-luminance objects are shot.

Next, the means and the control algorithms of items (A)-(D) will be described in a specific manner.

First, the detecting means of item (A) generates a histogram having the luminance as a variable, integrates each of a high-luminance portion and a low-luminance portion, and recognizes that the image has both high-luminance objects and low-luminance objects by comparing resulting integration values. An exposure time is determined on the basis of the luminance level of the high-luminance portion so that the high-luminance objects can be imaged without producing unduly high white levels. The higher the luminance level of a high-luminance portion is, the shorter the exposure time is set.

Figure 2A:
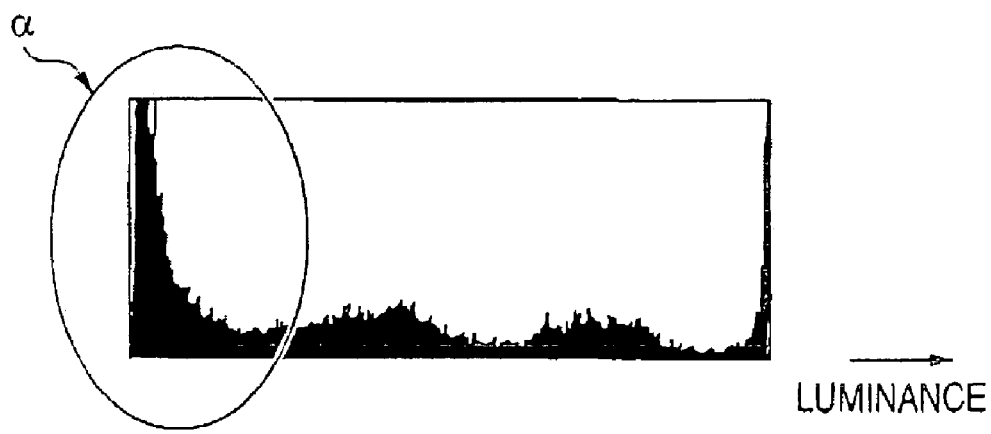
FIGS. 2A and 2B illustrate a histogram having the luminance as a variable that is used in image processing of the camera apparatus of FIG. 1.
Figure 2B:
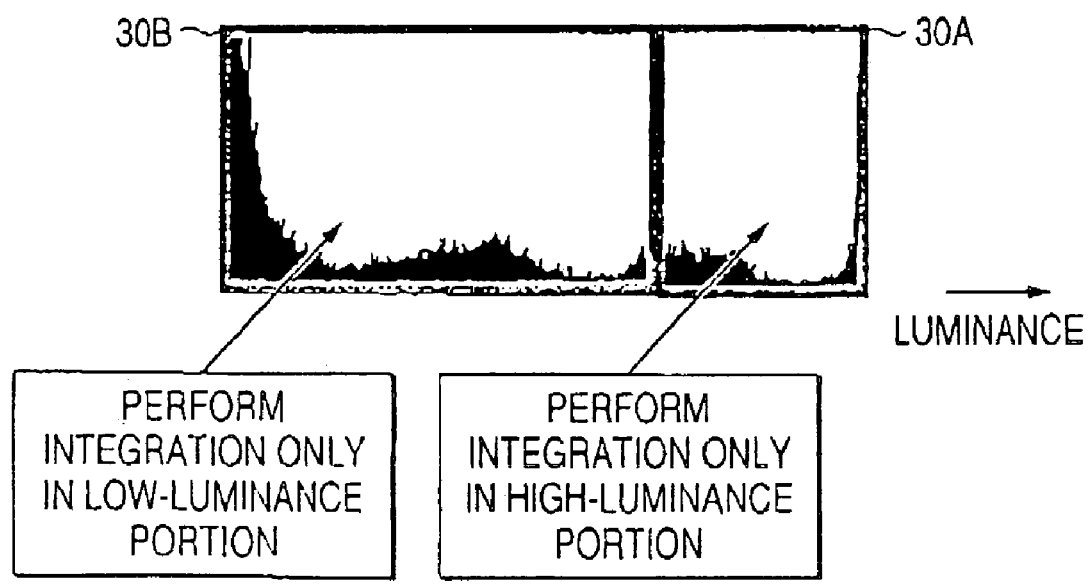

FIGS. 2A and 2B illustrate a histogram having the luminance as a variable that is used in the above-described processing. The horizontal axis represents the luminance, and the vertical axis represents the number of data (pixels).

As shown in FIG. 2A, in the case of a wide-dynamic-range image including both high-luminance objects and low-luminance objects, the number of pixels is extremely large in a range close to the minimum luminance level and a range close to the maximum luminance level.

In view of the above, in this embodiment, as shown in FIG. 2B, the image is divided into a high-luminance portion and a low-luminance portion by using frames 30A and 30B. An integration value of the numbers of pixels is calculated in each of the high-luminance portion and the low-luminance portion, and calculated integration values are compared with each other and a judgment is made. An exposure time control is performed on the basis of the luminance level of the high-luminance portion.

It is noted that image data obtained by a pre-scan operation of the imaging device are used for the above-described high-luminance level detection.

Figure 3A:
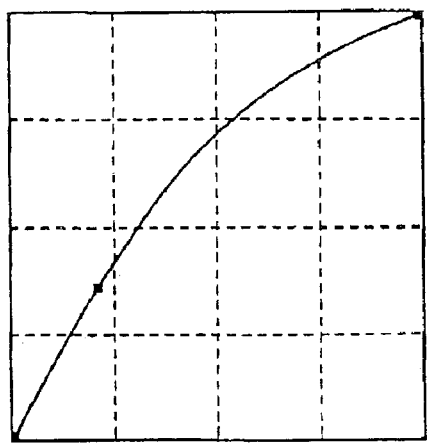
FIGS. 3A and 3B illustrate the characteristic of a gamma correction circuit used in the image processing of the camera apparatus of FIG. 1 in comparison with that of an ordinary gamma correction circuit.
Figure 3B:
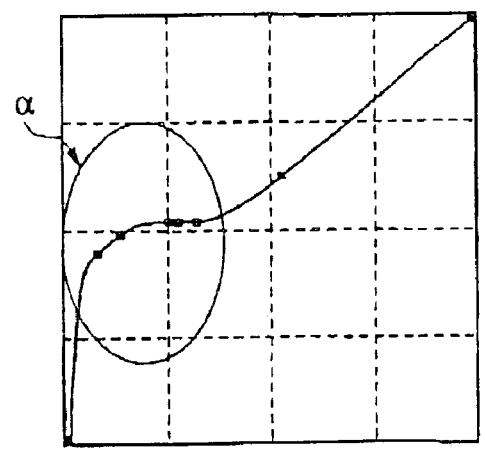

FIGS. 3A and 3B illustrate the characteristic of the gamma correction circuit of this embodiment in comparison with that of an ordinary gamma correction circuit. The horizontal axis represents the luminance, and the vertical axis represents the correction level.

As shown in FIG. 3A, in the ordinary gamma correction, the curve is almost flat (i.e., the gradient changes gently) from the low-luminance range to the high-luminance range. In contrast, in the gamma correction of the embodiment, as shown in FIG. 3B, the correction level of a low-luminance range (indicated by an elliptical frame a) is raised, whereby the output level of the image is increased in this low-luminance range to prevent blackening.

A control of changing the gamma connection characteristic is performed in real time in accordance with the degree of concentration of pixels in a minimum luminance range, that is, an object condition.

Figure 4:
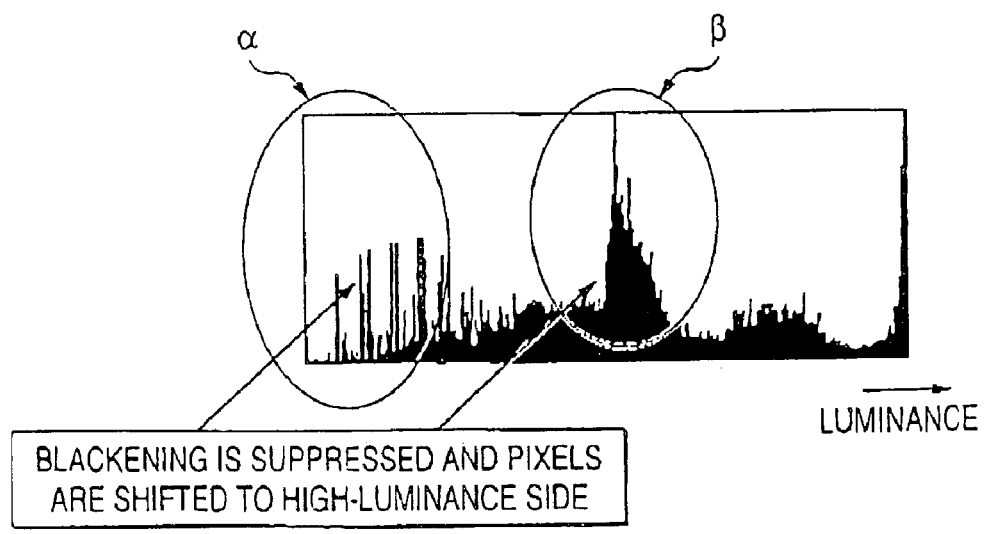
FIG. 4 is a histogram of a corrected image obtained by the gamma correction used in the image processing of the camera apparatus of FIG. 1.

FIG. 4 is a histogram of a corrected version of the image of FIGS. 2A and 2B obtained by the above gamma correction. As shown in FIG. 4, the number of pixels that are concentrated in the low-luminance range (indicated by the elliptical frame a) in FIG. 2 are distributed by the above gamma correction and moved to a medium-luminance range (indicated by an elliptical frame β).

Figure 5A:
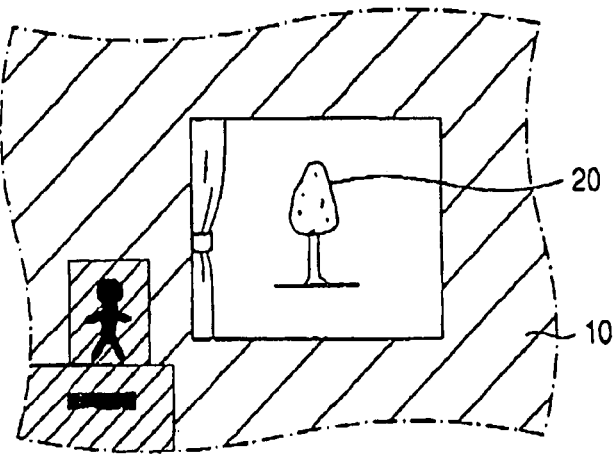
FIGS. 5A-5C schematically illustrate specific examples of images having a wide dynamic range.
Figure 5B:
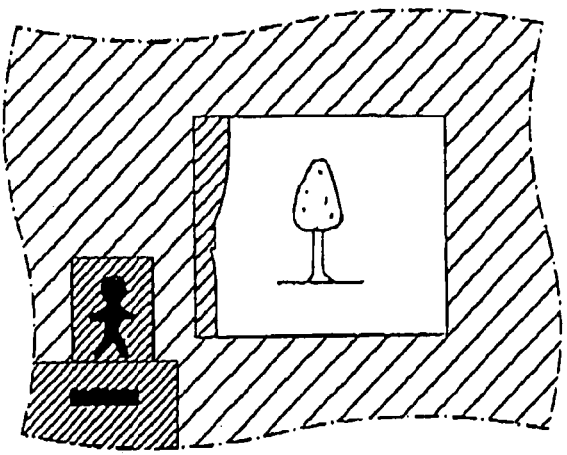
Figure 5C:
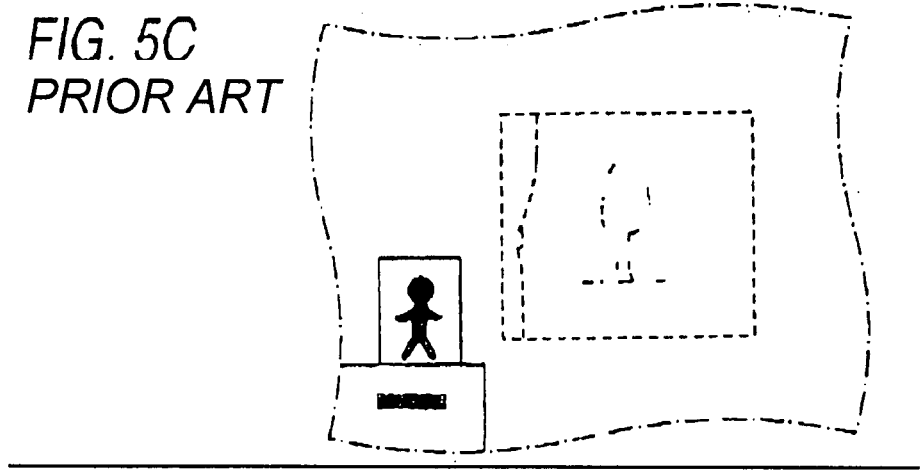

In this manner, the image can be reproduced effectively in both the low-luminance range and the high-luminance range, whereby a good image, like the image of FIG. 5A, can be obtained.

Although the above embodiment is such that the invention is applied to the camera apparatus using the CCD imaging device and the exposure control method therefor, the invention also can be applied to a camera apparatus that is separated from an imaging means and an exposure control method therefor. Further, the invention also can be applied to an image processing apparatus that performs a computation for an exposure control on the basis of an input image and an image processing method therefor.

The exposure control may include not only the exposure time adjustment but also an image signal gain adjustment.

The camera apparatus is an electronic apparatus having an imaging function (e.g., camera, cellular phone, or personal computer) or an electronic device module to be incorporated in such an electronic apparatus.

In the above embodiment, a gamma correction amount for an image signal in a low-luminance range is adjusted by performing an automatic exposure control in accordance with a detection result of an image signal in a high-luminance range. Conversely, a gamma correction amount for an image signal in a high-luminance range may be adjusted by performing an automatic exposure control in accordance with a detection result of an image signal in a low-luminance range. Also, in the latter case, a good image can be obtained for a wide-dynamic-range image. The gamma correction amount adjustment on an image signal in a low (or high)-luminance range may partially influence an image signal in a high (or low)-luminance range.

As described above, in the image processing apparatus, the camera apparatus, and the automatic exposure control method according to the invention, a high-luminance object signal contained in an image signal is detected and the exposure amount during imaging is controlled in accordance with the high-luminance object signal. The gamma correction amount is controlled in accordance with an imaging signal that is input while this automatic exposure control is performed on the basis of the exposure amount, whereby the luminance level of the image signal is raised in a low-luminance range. Therefore, when wide-dynamic-range objects including the high-luminance objects and the low-luminance objects are shot, unduly high white levels of high-luminance objects and blackening of low-luminance objects are prevented, and a good image is thereby produced.

Therefore, wide-dynamic-range images can be obtained properly and high functionality is achieved in various kinds of camera systems, for example.

What is claimed is:

1. An image processing apparatus comprising:
an image input unit for receiving image signals;
a detecting unit for detecting at least high-luminance object signals contained in the image signals received by the image input unit, wherein the detecting unit generates a histogram by calculating the number of pixels for each luminance level on the basis of the image signals and calculates the high-luminance object signals by integrating the pixels falling in a high-luminance frame and low-luminance object signals by integrating the pixels falling in a low-luminance frame;
an automatic exposure control unit for controlling an exposure amount to be used for an imaging operation in accordance with the high-luminance object signals detected by the detecting unit based on a comparison of the integration over the high-luminance frame and the low-luminance frame of the histogram; and
a gamma correction unit for controlling a gamma correction amount for the image signals received on the basis of the exposure amount controlled by the automatic exposure control unit and the degree of concentration of pixels in a minimum-luminance range detected in the histogram so that the luminance levels of the pixels in the low-luminance frame are raised and distributed to include a medium-luminance range;
wherein the gamma correction amount is performed in real time in accordance with an object condition in the image signals.

2. The image processing apparatus according to claim 1, wherein the automatic exposure control unit controls the exposure amount so that a white level of a high-luminance object does not become unduly high.

3. An image processing method comprising:
an image input step of receiving image signals;
a detecting step of detecting at least high-luminance object signals contained in the image signals received by the image input step, wherein the detecting step generates a histogram by calculating the number of pixels for each luminance level on the basis of the image signals and calculates the high-luminance object signals by integrating the pixels falling in a high-luminance frame and low-luminance object signals by integrating the pixels falling in a low-luminance frame;
an automatic exposure control step of controlling an exposure amount to be used for an imaging operation in accordance with the high-luminance object signals detected by the detecting step based on a comparison of the integration over the high-luminance frame and the low-luminance frame of the histogram; and
a gamma correction step of controlling a gamma correction amount for the image signals received on the basis of the exposure amount controlled by the automatic exposure control step and the degree of concentration of pixels in a minimum-luminance range detected in the histogram so that the luminance levels of the pixels in the low-luminance frame are raised and distributed to include a medium-luminance range;

wherein the gamma correction amount is performed in real time in accordance with an object condition in the image signals.

4. The image processing method according to claim 3, wherein the automatic exposure control step controls the exposure amount so that a white level of a high-luminance object does not become unduly high.

5. A camera apparatus comprising:

image input unit for receiving image signals;

a detecting unit for detecting at least high-luminance object signals contained in the image signals received by the image input unit, wherein the detecting unit generates a histogram by calculating the number of pixels for each luminance level on the basis of the image signals and calculates the high-luminance object signals by integrating the pixels falling in a high-luminance frame and low-luminance object signals by integrating the pixels falling in a low-luminance frame;

an automatic exposure control unit for controlling an exposure amount to be used for an imaging operation in accordance with the high-luminance object signals detected by the detecting unit based on a comparison of the integration over the high-luminance frame and the low-luminance frame of the histogram; and a gamma correction unit for controlling a gamma correction amount for the image signals received on the basis of the exposure amount controlled by the automatic exposure control unit and the degree of concentration of pixels in a minimum-luminance range detected in the histogram so that the luminance levels of the pixels in the low-luminance frame are raised and distributed to include a medium-luminance range;

wherein the gamma correction amount is performed in real time in accordance with an object condition in the image signals.

6. The camera apparatus according to claim 5, wherein the image input unit is a unit for receiving the image signals from a solid-state imaging device.

7. The camera apparatus according to claim 5, wherein the automatic exposure control unit controls the exposure amount so that a white level of a high-luminance object does not become unduly high.

8. An automatic exposure control method of a camera apparatus, comprising:

an image input step of receiving image signals;

a detecting step of detecting at least high-luminance object signals contained in the image signals received by the image input step, wherein the detecting unit generates a histogram by calculating the number of pixels for each luminance level on the basis of the image signals and calculates the high-luminance object signals by integrating the pixels falling in a high-luminance frame and low-luminance object signals by integrating the pixels falling in a low-luminance frame;

an automatic exposure control step of controlling an exposure amount to be used for an imaging operation in accordance with the high-luminance object signals detected by the detecting step based on a comparison of the integration over the high-luminance frame and the low-luminance frame of the histogram; and a gamma correction step of controlling a gamma correction amount for the image signals received on the basis of the exposure amount controlled by the automatic exposure control step and the degree of concentration of pixels in a minimum-luminance range detected in the histogram so that the luminance levels of the pixels in the low low-luminance frame are raised and distributed to include a medium-luminance range;

wherein the gamma correction amount is performed in real time in accordance with an object condition in the image signals.

9. The automatic exposure control method according to claim 8, wherein the image input step is a step of receiving the image signals from a solid-state imaging device.

10. The automatic exposure control method according to claim 8, wherein the automatic exposure control step controls the exposure amount so that a white level of a high-luminance object does not become unduly high.

11. An image processing apparatus comprising:

an image input unit for receiving image signals;

a detecting unit for detecting at least high-luminance object signals contained in the image signals received by the image input unit, wherein the detecting unit generates a histogram by calculating the number of pixels for each luminance level on the basis of the image signals and calculates the high-luminance object signals by integrating the pixels falling in a high-luminance frame and low-luminance object signals by integrating the pixels falling in a low-luminance frame;

an automatic exposure control unit for controlling an exposure amount to be used for an imaging operation in accordance with the high-luminance object signals detected by the detecting unit based on a comparison of the integration over the high-luminance frame and the low-luminance frame of the histogram; and a gamma correction unit for controlling a gamma correction amount for the image signals received on the basis of the exposure amount controlled by the automatic exposure control unit and the degree of concentration of pixels in a minimum-luminance range detected in the histogram so that the luminance levels of the pixels in the low-luminance frame are raised non-linearly and distributed to include a medium-luminance range;

wherein the gamma correction circuit corrects the low-luminance in real time by determining the distribution of low-luminance image signals in the received image signals, identifying portions of the distribution of low-luminance image signals, adjusting the luminance of the image signals by increasing the gradation between low-luminance image signals in the identified portions of the distribution, and reducing the gradation between luminance image signals in non-identified portions.

* * * * *